Oct. 22, 1963   G. D. BRADLEY   3,107,956
BEARING LUBRICATION ARRANGEMENT
Filed April 2, 1962

INVENTOR.
GUY D. BRADLEY
BY Robert H Montgomery
HIS ATTORNEY

United States Patent Office 3,107,956
Patented Oct. 22, 1963

3,107,956
BEARING LUBRICATION ARRANGEMENT
Guy D. Bradley, Erie, Pa., assignor to General Electric Company, a corporation of New York
Filed Apr. 2, 1962, Ser. No. 184,208
5 Claims. (Cl. 308—187)

This invention relates to a bearing lubrication arrangement and, more particularly, to a bearing lubrication arrangement adapted to meter lubricant to an anti-friction bearing assembly.

Anti-friction bearings may be classified in one manner as oil-lubricated or grease-lubricated. In the great majority of installations, grease is used as the lubricant for several reasons, one of which is relative simplicity of bearing assembly construction, including a lubricant-retaining reservoir which contributes to economy. The grease per se is not a bearing lubricant, but is a vehicle for oil contained therein which provides lubrication for the bearings. Improper use of grease as a lubricant may produce deleterious effects. For example, if excessive amounts of grease are introduced directly into a bearing assembly between the races, the excessive grease may be churned upon operation of the bearing and overheated, thereby resulting in destruction of the grease as a lubricating medium. Too little grease can also shorten bearing life due to an insufficient supply of oil for the needs of the bearing, and it will be apparent that frequent regreasing or lubricating of bearing assemblies contributes to undesired maintenance expenses.

An additional problem directly related to bearing lubrication involves the undesired displacement of grease axially along the shaft and into the confines of a machine whose shaft is rotatably supported by the bearing assembly, either during operation or when regreasing. To effect removal of old grease from a lubricant-retaining reservoir, new grease is forced into the reservoir-defining means, establishing a pressure which tends to force old grease out of the lubricant-retaining reservoir through a purging port. In many instances this regreasing process may force grease axially through the bearing assembly and the clearance between the housing and the shaft and into the confines of the machine. When this occurs, the grease usually is thrown outwardly into engagement with machine elements. In the case of dynamoelectric machines, this may cause deterioration of the insulation or coat the coil end turns and serve as an insulation effective to limit the heat-dissipating capabilities of the coils. Additionally, if grease should be flung on a current collector, such as a commutator, its operation would be greatly impaired.

Constructions have been devised to combat the aforementioned problems by providing a lubricant-retaining reservoir adjacent a bearing cavity on an anti-friction bearing therein and providing some sort of grease metering device or apertures therebetween which limits the amount of grease which may be forced into a bearing cavity upon regreasing of the reservoir. However, in these constructions, through too frequent regreasings, it is possible to overgrease the bearing.

The present invention relates to a combination metering and check valve arrangement and has as a primary object the provision of a new and improved bearing lubrication arrangement which positively prevents overgreasing of a bearing and which meters lubricant from a lubricant-retaining reservoir to the bearing during operation of the bearing.

A further object of the invention is to provide a bearing lubrication arrangement which seals a bearing cavity from a lubricant-retaining reservoir upon establishment of a predetermined pressure in the reservoir upon regreasing thereof, and which meters lubricant to the bearing upon operation thereof.

Another object of the invention is to provide such a bearing lubrication arrangement which furnishes a visual indication when the lubricant reservoir is fully charged.

Briefly stated, the invention in one form thereof comprises a resilient valve type metering element positioned between a lubricant reservoir and a bearing cavity having a bearing therein supporting a rotatable shaft. As lubricant is introduced into the lubricant reservoir and creates a predetermined pressure on the metering element, the resilient metering element seals the bearing cavity from the reservoir to prevent overgreasing of the bearing to the bearing cavity. Continuation of application of grease to the reservoir will force excess grease to excrete from the reservoir about the peripheral surface of the shaft and afford the applicator a visual indication that a proper amount of grease has been administered. As the pressure of the grease in the reesrvoir subsides, the metering element returns to its normal position and defines a lubricant-metering orifice between the reservoir and the bearing cavity.

The novel features of the invention are pointed out with particularity in the claims annexed to and forming a part of this specification. However, the invention, both as to its organization and operation, together with further objects and advantages thereof, may best be understood by reference to the following description taken in conjunction with the drawings wherein:

In the drawing, like reference characters designate like parts throughout the several views which show a shaft extending outwardly from a machine employing anti-friction bearings, such as a dynamoelectric machine or an engine, air compressor, or the like.

Figure 1:
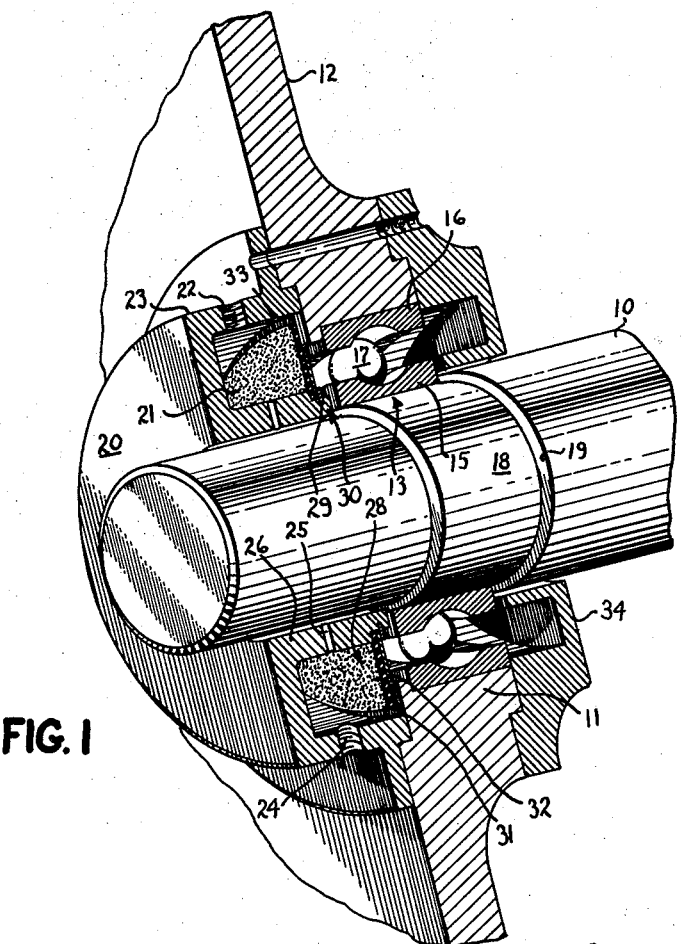
FIG. 1 is a perspective view in section of a rotatable shaft support including a bearing lubrication arrangement embodying the invention.

Reference is now made to FIG. 1 which illustrates a shaft 10 rotatably supported in a bearing bracket 11 which is defined in a bearing support which may be an end wall 12 of a dynamoelectric machine. An opening is defined by bearing bracket 11 in end wall 12 to receive and support an anti-friction bearing assembly 13 which rotatably supports shaft 10 in the bearing bracket 11. The anti-friction bearing assembly 13 comprises inner and outer races 15 and 16 with bearing elements 17 positioned therebetween and arranged to be held in spaced relation by a cage, not shown, for preventing their displacement circumferentially with respect to each other.

A peripheral surface 18 is provided on shaft 10 somewhat smaller in diameter and defining a shoulder 19 on shaft 10 and non-rotatably mounts inner race 15 thereon. The shoulder 19 forms a positive stop for the inner race 15 and longitudinally positions the shaft 10 with respect to the bearing bracket 11 in end wall 12.

In accordance with the invention, an annular member 20 of generally C-shape cross section, as illustrated, defines an annular lubricant reservoir 21 about shaft 10 and adjacent bearing assembly 13. Reservoir 21 communicates with the anti-friction bearing assembly 13. Member 20 is positioned about shaft 10 and is adapted to be connected by bolts, not shown, receivable in bolt-receiving means in the bearing bracket 11 or end wall 12 to thereby define lubricant-storing reservoir 21. In order to provide access to the lubricant-storing reservoir 21, a lubricant loading port 22 is defined in the outer peripheral wall 23 of member 20. A purging port 24 is also defined in the wall 23 of member 20 at a lower portion thereof. One or more lubricant pressure relief orifices 25 may be disposed in the inner peripheral wall 26 of member 20.

A lubricant metering assembly 28 having a valve action, as hereinafter described, is secured annularly to the peripheral surface of wall 26 of member 20 in any suitable manner, such as, in this instance, a snap ring 29. The wall 26 is appropriately peripherally recessed at 30 to receive the metering assembly 28 and the snap ring 29. The metering assembly 28 comprises a rubber-like or plastic annular resilient diaphragm, or element, 31 and an annular stiffening or back-up plate 32 to prevent bowing of the diaphragm 31. Snap ring 29 compressively locks the entire metering assembly 28 in position. The diameter of the flexible diaphragm 31 is selected to define an annular lubricant orifice or passage 33 between the outer peripheral edge of the flexible diaphragm 31, wall 23 and bearing bracket 11.

In accordance with an aspect of the invention, when a lubricant, such as grease, is introduced from a grease gun or similar device into the lubricant-storing reservoir 21 through the lubricant loading port 22, a small amount of grease will seep through the annular lubricant passage 33 into the anti-friction bearing assembly 13 until the grease introduced into reservoir 21 exerts a predetermined pressure on diaphragm 31. When the predetermined pressure is exerted on flexible diaphragm 31, the unrestrained outer peripheral portion thereof will be forced against bearing bracket 11 and thereby seal reservoir 21 from bearing assembly 13 and checks any further admittance of grease into the anti-friction bearing assembly 13. At this point, a selected amount of grease has been supplied to the anti-friction bearing assembly 13. As the pressure continues to rise in the lubricant-storing reservoir 21, grease will be forced out of reservoir 21 through the lubricant pressure relief orifices 25 and onto the peripheral surface of the shaft 10. When the grease becomes visible about shaft 10, a visual indication is obtained that the proper amount of lubricant has been placed in the reservoir 21. Thus, the clearance between the shaft 10 and wall 26 is effectively sealed by grease which protects the anti-friction bearing assembly 13 from any ingressing atmospheric matter.

As the pressure in the lubricant-storing reservoir 21 subsides, due to continued flow of grease through the relief ports 25, the flexible diaphragm 31 will return toward its normal position and commence metering a proper amount of lubricant to the anti-friction bearing assembly 13. As the diaphragm opens to re-define metering passage 33, oil will bleed from the grease through the passage 33 into the bearing assembly. As the resilient diaphragm returns to its normal position to define passage 33, it will displace grease into passage 33 and adjacent outer race 16. Through capillary action, due to the physical structure of the grease, oil will migrate into the bearing assembly.

If unneeded grease should be introduced into the lubricant-storing reservoir 21 after the diaphragm has returned to its normal position after a period of time, resilient diaphragm 31 will again seal off the anti-friction bearing assembly 13 when a predetermined pressure is established in the reservoir and protect the bearing assembly from an overload of grease.

The purging of dry, lifeless grease from the lubricant-storing reservoir 21 is accomplished in the usual manner upon recharging of reservoir 21.

An inboard bearing cap 34 is located adjacent the inner portion of the bearing arrangement and protects the confines of the machine from any oil seepage.

Figure 2:
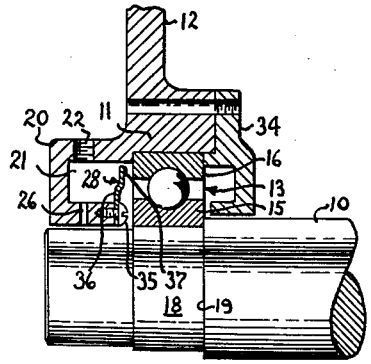
FIG. 2 is a sectional plan view of a rotatable shaft support including a bearing lubrication arrangement in another embodiment of the invention.

Another embodiment of the invention is illustrated in FIG. 2. In this application of the invention, the lubricant reservoir-defining member 20 is made integral with the bearing support or end wall 12 and bearing bracket 11. The metering assembly 28 in this embodiment is peripherally secured to the lubricant reservoir-defining member 20 by bolts or screws 35 annularly disposed thereabout. The metering and sealing member in FIG. 2 comprises a flexible metallic diaphragm 36 instead of the rubber-like or plastic diaphragm 31 shown in FIG. 1. An annular bead 37, of elastomeric material having good sealing properties, is formed on the free inboard peripheral surface of the diaphragm 36 and forms a lubricant seal when the lubricant storing-reservoir 21 has been fully charged with grease. The bead 37, as will readily be seen, will seal against the outer race 16 of the anti-friction bearing assembly 13.

Figure 3:
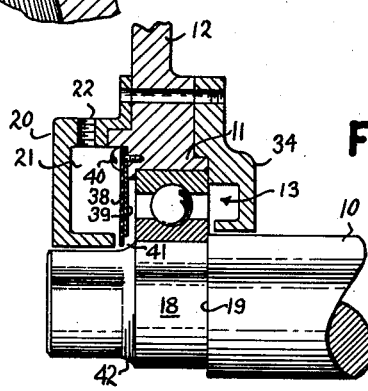
FIG. 3 is a sectional plan view of a rotatable shaft support including a bearing lubrication arrangement embodying the principles of the invention in still another embodiment thereof.

FIG. 3 is a further embodiment of the invention and features a lubricant reservoir-defining member 20 which is removable without exposing the anti-friction bearing assembly 13 to atmospheric conditions. In this construction the metering assembly comprises a flexible diaphragm 38 and stiffening or back-up plate 39 which are secured to bearing bracket 11 adjacent the outer periphery of the diaphragm 38 and plate 39 by a plurality of bolts or screws 40. In a manner similar to that explained in conjunction with FIGS. 1 and 2, lubricant pressure in reservoir 21, FIG. 3, upon introduction of grease therein, will force the flexible diaphragm 38 to seal off the annular lubricant passage 41 against the sloping shoulder 42 of shaft 10. The grease will then flow outwardly along the shaft 10 and give visual indication to the operator that reservoir 21 is fully charged.

From the foregoing exemplary embodiments of the invention, it will be seen that the invention provides a combination check valve and metering means which positively prevents over-lubrication of bearings, provides a visual indication when a lubricant reservoir is fully charged with grease, and also meters lubricant to an anti-friction bearing assembly.

Where a rubber-like diaphragm is used, as exemplified by FIGS. 1 and 3, the diaphragm material is selected to be a material which will not be detrimentally affected by the lubricant. The degree of flexibility of a particular diaphragm and its dimensions chosen to define a given metering passage will be selected in accordance with the parameters of the particular application, such as bearing size, lubricant reservoir pressure at which metering diaphragm is to close, etc. It will be apparent that either periphery of the metering diaphragm may be made the free or sealing and metering edge and may be made to seal against a bearing bracket or support, bearing race, or the supported shaft, as exemplified in the foregoing description.

While the invention has been described in particular embodiments thereof, modifications thereto and other embodiments thereof may occur to those skilled in the art which do not depart from the spirit and scope of the invention. Accordingly, the appended claims are intended to cover all modifications and embodiments of the invention which do not depart from the spirit and scope of the invention.

What is claimed as new and is desired to secure by Letters Patent of the United States is:

1. In combination with a bearing cavity containing an antifriction type bearing rotatably supporting a shaft; lubricant metering means for said bearing comprising: a member having an annular channel in one broad surface thereof and a bore therethrough concentric with said channel, said member being disposed about said shaft adjacent said bearing cavity so that said bore defines a wall adjacent to and surrounding said shaft and said annular channel defines an annular lubricant reservoir isolated from said shaft and adjacent one side of said bearing; means associated with said member for introducing lubricant into said annular channel; an annular resilient element disposed between said annular lubricant reservoir and said bearing, said element having an outer diameter larger than the diameter of said bearing cavity and an inner diameter smaller than the inner diameter of said annular channel and at least as large as said bore; and means for securing said resilient element at one periphery to said member to isolate said lubricant reservoir from said bearing with the other periphery of said element defining a normally open metering valve providing communication between said lubricant reservoir and said bearing, said resilient element pivotally flexing about its secured periphery in response to lubricant pressure in said reservoir to close said metering valve and prevent lubricant passing from said reservoir to said bearing.

2. The lubricant metering means of claim 1 wherein said resilient element is secured at its inner periphery to said member with its outer periphery defining said normally open metering valve.

3. The lubricant metering means of claim 1 wherein at least one orifice is disposed in the wall defined by said bore adjacent to and surrounding said shaft, said orifice communicating with said annular lubricant reservoir so that lubricant from said reservoir may be discharged around said shaft.

4. In combination with a bearing cavity defined in wall means and containing a bearing having an inner race, an outer race and bearing elements therebetween with said bearing rotatably supporting a shaft, lubricant metering means for said bearing comprising: a member having an annular channel in one broad surface thereof and a bore therethrough concentric with said channel, said member being disposed about said shaft adjacent said bearing cavity so that said bore defines a wall adjacent to and surrounding said shaft and said annular channel defines an annular lubricant reservoir isolated from said shaft and adjacent one side of said bearing; means associated with said member for introducing lubricant into said annular channel; an annular resilient element disposed between said annular lubricant reservoir and said bearing, said element having an outer diameter larger than the inside diameter of said outer bearing race and an inside diameter smaller than the inside diameter of said annular channel and at least as large as said bore; and means securing said resilient element at its inner periphery to said member to isolate said lubricant reservoir from said bearing with the outer periphery of said element defining a normally open metering valve providing communication between said lubricant reservoir and said bearing, said resilient element pivotally flexing about its secured inner periphery in response to lubricant pressure in said reservoir to move said outer periphery into sealing engagement with the outer race of said bearing to prevent lubricant passing from said reservoir to said bearing.

5. In combination with a bearing cavity defined in wall means and containing a bearing having an inner race, an outer race and bearing elements therebetween with said bearing rotatably supporting a shaft, lubricant metering means for said bearing comprising: a member having an annular channel in one broad surface thereof and a bore therethrough concentric with said channel, said member being disposed about said shaft adjacent said bearing cavity so that said bore defines a wall adjacent to and surrounding said shaft and said annular channel defines an anular lubricant reservoir isolated from said shaft and adjacent one side of said bearing; means associated with said member for introducing lubricant into said annular channel; an annular resilient element disposed between said annular lubricant reservoir and said bearing, said element having an outer diameter larger than the diameter of said bearing cavity and an inner diameter smaller than the inside diameter of said annular channel and at least as large as said bore; and means securing said resilient element at its inner periphery to said member to isolate said lubricant reservoir from said bearing with the outer periphery of said element defining a normally open metering valve providing communication between said lubricant reservoir and said bearing, said resilient element pivotally flexing about its secured inner periphery in response to lubricant pressure in said reservoir to move said outer periphery into sealing engagement with the wall means adjacent said bearing cavity to prevent lubricant passing from said reservoir to said bearing.

References Cited in the file of this patent

UNITED STATES PATENTS

| | | |
|---|---|---|
| 2,249,501 | Teker | July 15, 1941 |
| 2,354,724 | Wessenger | Aug. 1, 1944 |
| 2,449,574 | Wilcock | Sept. 21, 1948 |
| 2,548,229 | Mendenhall | Apr. 10, 1951 |
| 2,812,456 | Lubberhuizen | Nov. 5, 1957 |
| 2,858,175 | Sutherland | Oct. 28, 1958 |